US008241753B2

(12) United States Patent
Kenens et al.

(10) Patent No.: US 8,241,753 B2
(45) Date of Patent: *Aug. 14, 2012

(54) COMPOSITE THERMOPLASTIC ELASTOMER STRUCTURES WITH HIGH ADHESION PERFORMANCE AND USES FOR THE SAME

(75) Inventors: Leander Michiel Kenens, Kessel-Lo (BE); Eric Paul Jourdain, Rhode Saint Genese (BE); Jean-Roch Schauder, Wavre (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 1471 days.

This patent is subject to a terminal disclaimer.

(21) Appl. No.: 11/810,030

(22) Filed: Jun. 4, 2007

(65) Prior Publication Data
US 2008/0299397 A1 Dec. 4, 2008

(51) Int. Cl.
 B32B 27/00 (2006.01)
 B32B 15/04 (2006.01)
 B32B 27/36 (2006.01)
 B32B 27/08 (2006.01)
(52) U.S. Cl. ..... 428/500; 428/515; 428/457; 428/423.1; 428/476.3; 428/483
(58) Field of Classification Search .................. None
 See application file for complete search history.

(56) References Cited

U.S. PATENT DOCUMENTS

| 2,465,319 | A | | 3/1949 | Whinfield et al. |
| 3,047,539 | A | | 7/1962 | Pengilly |
| 3,746,676 | A | | 7/1973 | Joyner et al. |
| 4,198,327 | A | | 4/1980 | Matsumoto et al. |
| 4,311,628 | A | | 1/1982 | Abdou-Sabet et al. |
| 4,540,753 | A | | 9/1985 | Cozewith et al. |
| 4,867,336 | A | * | 9/1989 | Stewart ............ 220/359.3 |
| 5,177,147 | A | | 1/1993 | Spenadel et al. |
| 5,403,884 | A | | 4/1995 | Perlinski ............ 524/524 |
| 5,529,650 | A | | 6/1996 | Bowers et al. ............ 156/64 |
| 5,672,660 | A | | 9/1997 | Medsker et al. |
| 6,099,676 | A | | 8/2000 | Hayashi ............ 156/244.23 |
| 6,147,180 | A | | 11/2000 | Markel et al. |
| 6,525,157 | B2 | | 2/2003 | Cozewith et al. |
| 6,647,719 | B2 | | 11/2003 | Truninger |
| 6,770,713 | B2 | | 8/2004 | Hanke et al. |
| 6,881,800 | B2 | | 4/2005 | Friedersdorf |
| 6,884,850 | B2 | | 4/2005 | Schauder et al. |
| 7,713,636 | B2 | * | 5/2010 | Song et al. ............ 428/500 |
| 2002/0032284 | A1 | | 3/2002 | Jourdain et al. ............ 525/285 |
| 2004/0236042 | A1 | | 11/2004 | Datta et al. |
| 2005/0215964 | A1 | | 9/2005 | Autran et al. |
| 2006/0108705 | A1 | * | 5/2006 | Rowley ............ 264/150 |
| 2006/0160943 | A1 | | 7/2006 | Weir |

FOREIGN PATENT DOCUMENTS

| EP | 0 239 685 | 10/1987 |
| EP | 0 370 786 | 5/1990 |
| EP | 1 002 809 | 5/2000 |
| EP | 1 017 729 | 7/2000 |
| EP | 1 072 712 | 1/2001 |
| EP | 1 561 762 | 8/2005 |
| EP | 1 614 699 | 1/2006 |
| WO | WO 00/36011 | 6/2000 |
| WO | WO 02/36651 | 5/2002 |
| WO | WO 02/083753 | 10/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2006/101966 | 9/2006 |

OTHER PUBLICATIONS

R. Lewis, Sr., "*Periclase*", Periodic Table of Elements Groups, Hawley's Condensed Chemical Dictionary, John Wiley & Sons, 13$^{th}$ ed., 1997, pp. 852-853.
G. Ver Strate et al., "*Near Monodisperse Ethylene-Propylene Copolymers by Direct Ziegler-Natta Polymerization. Preparation, Characterization, Properties*", Macromolecules, 1998, vol. 21, pp. 3360-3371.
A.R. Cooper, "*Molecular Graphics*", Concise Encyclopedia of Polymer Science and Engineering, Kroschwitz ed., John Wiley & Sons, 1990, pp. 638-639.

* cited by examiner

*Primary Examiner* — Sheeba Ahmed
(74) *Attorney, Agent, or Firm* — Stephen Timmins; Kevin M. Faulkner; Leandro Arechederra, III

(57) ABSTRACT

Provided is a composition thermoplastic elastomer structure comprising (1) a first component comprising a first elastomeric component comprising an at least partially vulcanized rubber and a thermoplastic resin, (2) an adhesive later comprising a grafted random propylene copolymer and (3) a third component comprising a polyamide or polyester. The third component is at least partially adhered to the adhesive component, which is in turn, partially adhered to the first component. The structure has superior adhesive properties between structures. Also provided are articles made from the structures, particularly automotive weather seals, glass run channels, a noise attenuating device, automotive interior part, automotive belt, automotive hose, industrial belt, industrial hose, packaging material, construction material, decorative building material, and other consumer goods.

49 Claims, No Drawings

COMPOSITE THERMOPLASTIC ELASTOMER STRUCTURES WITH HIGH ADHESION PERFORMANCE AND USES FOR THE SAME

FIELD OF THE INVENTION

The present invention generally relates to composite thermoplastic elastomer and/or thermoplastic vulcanizate compositions with high adhesion performance characteristics, preferably composite structures of thermoplastic vulcanizate, grafted propylene-based elastomer and a flock.

BACKGROUND OF THE INVENTION

Flocked materials for use in automotive sealing systems are well known. Most often, these flocked materials are made of a vulcanized rubber component to which a primer and an adhesive have been applied. A flock material is then added that adheres to the adhesive. Many problems exist with the preparation of these materials, including environmental concerns related to the solvent-based primers and adhesives that are usually employed. Further, the application of the primers and adhesives must usually be done in excess in order to obtain sufficient coverage of the vulcanized rubber substrate, further increasing the cost of these systems.

Changes to the substrate materials have led to changes in the materials needed to create flocked substrates for use in automotive sealing systems. In particular, thermoplastic elastomers ("TPEs") and thermoplastic vulcanizates ("TPVs") are prime contenders to replace vulcanized rubbers in these sealing systems. The reprocessability and superior physical characteristics of the TPEs and TPVs make them more desirable for use in the sealing systems. However, many of these same characteristics make the TPEs and TPVs less desirable for use with the prior adhesion systems for creating flocked materials. In particular, when a polypropylene is used as the thermoplastic phase of a TPV, the non-polar polypropylene does not provide a surface readily used for the adherence of mostly polar flock materials. New solvent-based adhesives have been used, but retain the undesirable cost and environmental impacts of the prior generation of the adhesives. Certain water-based adhesives have been used in an attempt to avoid the environmental impacts of solvent-based ones, but these often require the use of a primer to first prepare the polypropylene surface before the adhesive will sufficiently adhere to it. The use of primer increases costs and also has undesirable environmental impacts. Additionally, the water-based adhesives currently available often do not provide sufficient performance to keep the flock adhered to TPV substrate materials over the thousands of operation cycles to which an automotive sealing system such as a glass run channel is subjected.

There then exists a need for a non-solvent based adhesive system which will readily allow the flocking of non-polar substrates such as polypropylene or polypropylene-based TPVs with polar flocks (such as polyester or nylon) while maintaining good adherence to the substrate over an extended time period and under demanding conditions of exposure to the elements and large numbers of operation cycles.

The present invention provides a composite structure made up of a second component (a grafted propylene-based elastomer in one embodiment) and a third flock component in the form of a ribbon or tape that provides excellent compatibility with non-polar substrates, particularly polypropylene-based TPVs. In another aspect, a substrate is used that may be pre-formed into a shape, including that of a desirable end use product, and the second component and a flock components are adhered to it. In yet other aspects, the present invention provides processes for producing these composite structures, useful articles formed from them and methods for producing the same.

SUMMARY OF THE INVENTION

One aspect of the invention is directed to a composite structure comprising: a first component; a second component comprising a grafted propylene-based elastomer comprising propylene-derived monomer units; and from 0.1 to 10 wt %, based on the weight of the grafted propylene-based elastomer, graft comonomer units; wherein, the grafted propylene-based elastomer has a heat of fusion of less than 75 J/g and a $T_m$ of less than 105° C.; and a third component comprising a polar material, wherein the third component is at least partially adhered to the second component and the second component is at least partially adhered to the first component.

Another aspect of the invention is directed to a method for securing a flock to a substrate comprising: providing a first component forming an elastomeric substrate; contacting a second component with the first component under conditions sufficient to at least partially adhere the second component to the first component, the second component comprising a grafted propylene-based elastomer comprising propylene-derived monomer units; from 0.1 to 30 wt %, based on the weight of the grafted propylene-based elastomer, primary comonomer units derived from any of $C_2$ or $C_4$-$C_{20}$ alpha olefins; from 0.1 to 10 wt %, based on the weight of the grafted propylene-based elastomer, graft comonomer units; wherein, the grafted propylene-based elastomer has a heat of fusion of less than 75 J/g and a $T_m$ of less than 105° C.; and contacting a flock with the second component under conditions sufficient to at least partially adhere the flock to the second component, the flock comprising polyamide, polyester, acrylic, rayon or mixtures thereof.

These and other aspects of the invention are described further in the description.

DETAILED DESCRIPTION

Any mention of "incorporation by reference" or "incorporated herein by reference" herein is intended to incorporate the particular reference described in whole as if fully reprinted herein and for all permitted purposes for all jurisdictions, such as the United States of America, that allow such incorporation by reference.

As used herein, the new numbering scheme for the Periodic Table of Elements Groups are used as in Hawley's Condensed Chemical Dictionary 852 (John Wiley & Sons, 13th ed. 1997).

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, when a polymer is referred to as "comprising a monomer," the monomer is present in the polymer in the polymerized form of the monomer or in the derivative form the monomer.

As used herein, "molecular weight" means weight average molecular weight ("Mw"). Mw is determined using Gel Permeation Chromatography. Molecular Weight Distribution ("MWD") means Mw divided by number average molecular weight ("Mn"). (For more information, see U.S. Pat. No. 4,540,753 to Cozewith et al. and references cited therein, and in Verstrate et al., 21 MACROMOLECULES 3360 (1998)). The "Mz" value is the high average molecular weight value, calculated as discussed by A. R. Cooper in Concise Encyclopedia of Polymer Science and Engineering 638-39 (J. I. Kroschwitz, ed. John Wiley & Sons 1990).

As used herein, "thermoplastic" includes only those thermoplastic materials that have not been functionalized or substantially altered from their original chemical composition. For example, as used herein, polypropylene, propylene ethylene copolymers, propylene alpha-olefin copolymers, polyethylene and polystyrene are thermoplastics. However, maleated polyolefins are not within the meaning of thermoplastic as used herein.

As used herein, "polyurethane adhesive" includes urethane monomer derived polymers or the product of a polymeric reaction of suitable precursors and may be cross-linked. Such products will be compounds formed by reaction with isocyanate, a plurality of urethane groups or even biuret. The precursors will contain amine, hydroxyl or hydrogen reactive groups. The polyurethane adhesives may be either solvent-based ("S-PU adhesives") or water-based ("W-PU adhesives").

As used herein, the term "thermoplastic vulcanizate composition" (also referred to as simply thermoplastic vulcanizate or TPV) is broadly defined as any material that includes (at least) a dispersed, at least partially vulcanized, rubber component; a thermoplastic component; and an additive oil. Preferably, other ingredients, e.g., other additives, are also included.

As used herein, the term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," which also produces a "vulcanizate." Also, in at least one specific embodiment, the term vulcanized refers to more than insubstantial vulcanization, e.g., curing (crosslinking) that results in a measurable change in pertinent properties, e.g., a change in the melt index ("MI") of the composition by 10% or more (according to ASTM D1238 under any of its stated conditions). In at least that context, the term vulcanization encompasses any form of curing (crosslinking), both thermal and chemical, that can be utilized in dynamic vulcanization.

As used herein, the term "dynamic vulcanization" means vulcanization or curing of a curable rubber blended with a thermoplastic resin under conditions of shear at temperatures sufficient to plasticize the mixture. A "fully vulcanized" (or fully cured or fully crosslinked) rubber in which a given percentage range of the crosslinkable rubber is extractable in boiling xylene or cyclohexane, e.g., 5 wt % or less, or 4 wt % or less, or 3 wt % or less, or 2 wt % or less, or 1 wt % or less. The percentage of extractable rubber can be determined by the technique set forth in U.S. Pat. No. 4,311,628, and the portions of that patent referring to that technique are hereby incorporated by reference for all jurisdictions where such incorporation is permitted.

As used herein, "adhere(d)," in particular when used to describe the interaction or connection of one component or structure of the invention with another, means any method of joining known to those of skill in the joining arts whether by mechanical (including electromechanical), chemical and/or physical means. For example mechanical means includes, but is not limited to application of an external force, clamping or securing with nuts and bolts. Chemical means include, but are not limited to, bond interaction between atoms or parts of atoms such as hydrogen, polar, ionic or covalent bonds. Physical means include, but are not limited to, high surface area interactions, chain entanglements, co-crystallization and Van der Waals' forces. A particular type or class of adherence may be described by applying the general category of the adherence as an adjective modifier, for example "chemically adhered" refers to those chemical means of adhering described above. "At least partially adhered" means some level of adherence greater than zero, for instance, it includes partial lamination, but would not include complete de-lamination of two components of the composite structures of the present invention.

As used herein, "weight percent" ("wt %"), unless noted otherwise, means a percent by weight of a particular component based on the total weight of the mixture containing the component. For example, if a mixture contains three pounds of sand and one pound of sugar, then the sand comprises 75 wt % (3 lbs. sand/4 lbs. total mixture) of the mixture and the sugar 25 wt %.

As used herein, "phr" is a measurement of the number of parts by weight of a non-rubber component of a thermoplastic elastomer or thermoplastic vulcanizate per 100 parts by weight of the rubber component of the thermoplastic elastomer or thermoplastic vulcanizate. For example, if a thermoplastic vulcanizate contains 15 parts by weight thermoplastic, 2.5 parts by weight carbon black and 250 parts by weight rubber, then it can be said to contain 6 phr thermoplastic and 1 phr carbon black. The term "phr" is commonly used by those of skill in the art of thermoplastic elastomers and vulcanizates and is readily understood by them to be as defined herein.

For purposes of the invention, Melt Flow Rates ("MFR") are determined in accordance with ASTM D1238 at 230° C. and 2.16 Kg weight.

For purposes of the invention, Melt Indices ("MI") are determined in accordance with ASTM D1238 at 190° C. and 2.16 kg weight.

Composite Structures

An aspect of the present invention is directed to composite structures comprising a first component, a second component and a third component where the third component is at least partially adhered to the second component and the second component is at least partially adhered to the first component. In another aspect, no first component is present. In yet another aspect, embodiments of the present invention are multilayer flocked films or tapes.

In at least one embodiment, the present invention further comprises an adhesive component at least partially disposed between the third component and the second component. When an adhesive component is present, the third component is at least partially adhered to the adhesive component, the adhesive component is at least partially adhered to the second component and the second component is at least partially adhered to the first component.

In an embodiment, the composite structures of the present invention are multilayer films or laminates. In an embodiment, one or more of the first component, second component, adhesive component and third component are a film or are pre-formed into the shape of a useful article. In a preferred embodiment, the first component is pre-formed into the shape of a useful article and the polymeric, and if present, the adhesive, structure(s) are films and the third component is a flock.

In another embodiment, the present invention excludes mixing of the components of the composite structures of the invention. For example, the present invention envisions a composite structure in which the first component does not mix with the second component, the second component does not mix with either the adhesive component or the third component and/or the third component does not mix with the adhesive component. "Mix" or "mixing" refers to intimate or any mixing other than minor mixing at physically adjacent surfaces or any mixing that is associated with adherence of components as described herein.

Each of the components of the composite structures of the present invention is described in more detail below.

First Component

The composite structures of the invention may include a first component, which may be alternatively referred to herein as a "substrate." When present, the first component forms a base upon which the second component is placed such that the second component is at least partially adhered to the first component. The first component and second component may be coextruded or the second component may be extruded onto an already formed first component. Preferably the substrate is shaped, either during coextrusion or before adhesion of the second component, such as to facilitate the formation of any of the shaped parts or articles of the invention that are described in more detail below.

In at least certain embodiments, the first component of the current invention is comprised of a thermoplastic, such as an olefinic thermoplastic, or an elastomeric material, such as thermoset rubber, thermoplastic elastomer ("TPE"), styrenic block copolymer, acrylic copolymer, polyurethane, block co-polyesters, block co-polyamides or thermoplastic vulcanizate ("TPV"). In other embodiments, the first components are reinforced by adding a core of metal, olefinic thermoplastic (such as a homo- or co-polymer of ethylene or propylene) or other rigid material to which the first component is then at least partially adhered.

The first component is preferably a TPE or TPV, i.e. a composition comprising an at least partially vulcanized rubber and a thermoplastic polyolefin polymer (also referred to as a thermoplastic resin). In a TPV, the rubber usually exists as discrete particles dispersed in a matrix of the thermoplastic polyolefin polymer. A number of blends can be used to form the thermoplastic vulcanizate, which are described below, or are identified in the patents that are incorporated by reference. A TPE can be generically defined as a rubber-like material that, unlike conventional rubbers, can be processed and recycled like thermoplastic materials (ASTM D1566). A TPV is a TPE that contains a vulcanized rubber, i.e. a chemically cross-linked rubbery phase, and is often produced by dynamic vulcanization (ASTM D1566). The term "dynamic vulcanization" is herein intended to include a vulcanization process in which a vulcanizable elastomer is vulcanized under conditions of high shear in the presence of a thermoplastic polyolefin resin. As a result, the vulcanizable elastomer is simultaneously crosslinked and dispersed as fine particles of a "micro gel" within the resin.

TPE and TPV materials have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

Procedures for dynamically vulcanizing materials, and examples of the materials that can be included in TPVs suitable for use as first components of the present invention, are disclosed in U.S. Pat. Nos. 4,311,628 and 5,672,660, incorporated herein by reference. Examples of TPEs suitable for use as the first components of the present invention are disclosed in U.S. Pat. No. 6,147,180, incorporated herein by reference.

Rubber

The term "rubber" broadly means any material that is considered by persons skilled in the art to be a "rubber," preferably a crosslinkable rubber (e.g., prior to vulcanization) or crosslinked rubber (e.g., after vulcanization). In addition to natural rubber, specific rubber components include, without limitation, any olefin-containing rubber such as ethylene-propylene copolymers ("EPM"), including particularly saturated compounds that can be vulcanized using free radical generators such as organic peroxides, as noted in U.S. Pat. No. 5,177,147, incorporated by reference in pertinent part. Other rubber components are ethylene-propylene-diene ("EPDM") rubber, or EPDM-type rubber. An EPDM-type rubber can be a terpolymer derived from the polymerization of at least two different $C_2$-$C_{10}$ monoolefin monomers, preferably $C_2$-$C_4$ monoolefin monomers, and at least one $C_5$-$C_{20}$ poly-unsaturated olefin. Those monoolefins desirably have the formula $CH_2$=CH—R where R is H or a $C_1$-$C_{12}$ alkyl. The preferred monoolefins are ethylene and propylene. Desirably the repeat units from at least two monoolefins (and preferably from ethylene and propylene) are present in the polymer in weight ratios of 15:85 to 85:15 (ethylene:propylene) and constitute from about 90 to about 99.6 weight percent of the polymer. The polyunsaturated olefin can be a straight chained, branched, cyclic, bridged ring, bicyclic, fused ring bicyclic compound etc., and preferably is a non-conjugated diene. Desirably, repeat units from the nonconjugated polyunsaturated olefin are from about 0.4 to about 10 weight percent of the rubber.

Another type of rubber is butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. Desirably, from about 90 to about 99.5 weight percent of the butyl rubber are repeat units derived from the polymerization of isobutylene, and from about 0.5 to about 10 weight percent of the repeat units are from at least one poly-unsaturated monomer having from 4 to 19 carbon atoms. Preferably the polyunsaturated monomer is isoprene or divinylbenzene. The polymer may be halogenated to further enhance reactivity in crosslinking. Preferably the halogen is present in amounts from about 0.1 to about 10 weight percent, more preferably about 0.5 to about 3.0 weight percent based upon the weight of the halogenated polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 weight percent isomonoolefin, more desirably from about 92 to about 98 weight percent, and from about 1 to about 12 weight percent p-alkylstyrene, more desirably from about 2 to about 8 weight percent based upon the weight of the copolymer before halogenation. Desirably the alkylstyrene is p-methylstyrene and the isomonoolefin is isobutylene. Desirably the percent bromine is from about 0.2 to about 8, more desirably from about 0.2 to about 3 weight percent based on the weight of the halogenated copolymer. The copolymer is a complementary amount, i.e., from about 92 to about 99.8, more desirably from about 97 to about 99.8 weight percent. These polymers are commercially available from Exxon Chemical Co.

EPDM, butyl and halobutyl rubbers are rubbers low in residual unsaturation and are preferred when the vulcanizate needs good thermal stability or oxidative stability. The rubbers low in residual unsaturation desirably have less than or equal to 10 weight percent repeat units having unsaturation. Desirably excluded are acrylate rubber and epichlorohydrin rubber.

Other non-limiting examples of rubbers are halobutyl rubbers and halogenated (e.g., brominated) rubber copolymers of p-alkylstyrene and an isomonoolefin having from 4 to 7 carbon atoms (e.g. isobutylene). Still other examples are rubber homopolymers of conjugated dienes having from 4 to 8 carbon atoms and rubber copolymers having at least 50 weight percent repeat units from at least one conjugated diene having from 4 to 8 carbon atoms.

Rubbers can also be natural rubbers or synthetic homo or copolymers of at least one conjugated diene. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Comonomers that may be used include vinyl aromatic monomer(s) having from 8 to 12 carbon atoms and acrylonitrile or alkyl-substituted acrylonitrile monomer(s) having from 3 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

Rubbers can also be synthetic rubber, which can be non-polar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

A list of preferred rubber components includes any rubber selected from the following: ethylene-propylene rubber (EPM), ethylene-propylene-diene rubber (EPDM), natural rubber (polyisoprene), butyl rubber, halobutyl rubber, halogenated rubber copolymer of p-alkystyrene and at least one $C_4$-$C_7$ isomonoolefin, a copolymer of isobutylene and divinyl-benzene, homopolymers of a conjugated diene (preferably a $C_4$-$C_8$ conjugated diene), copolymers of at least one conjugated diene and a comonomer (preferably where the copolymer has at least 50 weight percent repeat units from at least one $C_4$-$C_8$ conjugated diene and/or the comonomer is a polar monomer, a $C_8$-$C_{12}$ vinyl aromatic monomer, an acrylonitrile monomer, a $C_3$-$C_8$ alkyl substituted acrylonitrile monomer, an unsaturated carboxylic acid monomer, an unsaturated anhydride of a dicarboxylic acid or a combination thereof), unsaturated non-polar elastomers, polybutadiene elastomer, styrene-butadiene elastomer and mixtures thereof.

In another embodiment of the first layer, a cured thermoset rubber can also be employed alone, those compositions as described above.

Thermoplastic Resin

The term "thermoplastic resin" broadly means any material that is not a "rubber" (as defined herein) and that is a polymer or polymer blend considered by persons skilled in the art as being thermoplastic in nature, e.g., a polymer that softens when exposed to heat and returns to its original condition when cooled to room temperature. The thermoplastic resins of the present invention may be selected from any of the following: crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

In one or more embodiments, the thermoplastic resin is preferably a polypropylene (preferably isotactic) having a melting point greater than 110° C., or 120° C., or 130° C., or 140° C., or 150° C. In certain embodiments, the thermoplastic resin may include a polypropylene polymer having a MFR of 1.0 to 30 dg/min. Alternatively, the thermoplastic component may include a "fractional" polypropylene having a melt flow rate less than 1.0 dg/min. In yet another embodiment, the thermoplastic resin further includes a first polypropylene having a melting point greater than 110° C. and a melt flow ranging from 1.0 to 30 dg/min and a second polypropylene having a melting point greater than 110° C. and a melt flow of less than 1.0 g/min.

Preferably, the polypropylene used in the first components described herein that has a melting point above 110° C. includes at least 90 wt % propylene units and is isotactic. Alternatively, instead of isotactic polypropylene, a first component of the present invention may include a syndiotactic polypropylene, which in certain cases can have a melting point above 110° C. Yet another alternative thermoplastic resin can include an atactic polypropylene. The polypropylene can either be derived exclusively from propylene monomers (i.e., having only propylene units) or be derived from mainly propylene (more than 80% propylene). As noted elsewhere herein, certain polypropylenes having a high MFR (e.g., from a low of 10, or 15, or 20 dg/min to a high of 25 or 30 dg/min) may be used. Others having a lower MFR, e.g., "fractional" polypropylenes which have an MFR less than 1.0 dg/min may also be used.

An especially preferred thermoplastic resin is high-crystalline isotactic or syndiotactic polypropylene. This polypropylene generally has a density of from about 0.85 g/cm³ to 0.91 g/cm³, with the largely isotactic polypropylene having a density of from 0.90 g/cm³ to 0.91 g/cm³.

The thermoplastic resin may be present in the TPV in an amount of from any of the lower limits of 5, 8, 10 or 15 phr to any of the upper limits 20, 40, or 65 phr.

Additives

The term "additive" is defined herein to include any material that may be included as a part of the TPV, but that is neither a rubber nor a thermoplastic resin. For example, any process oil; curing agent, or filler is regarded as an "additive" for purposes of this disclosure. Curative and process oils are discussed below. A non-exclusive list of additives broadly includes carbon black and other particulate fillers, silica, titanium dioxide, colored pigments, clay, zinc oxide, stearic acid, stabilizers, anti-degradants, flame retardants, processing aids, adhesives, tackifiers, plasticizers, wax, discontinuous fibers (such as cellulose fibers). Particularly when non-black fillers are used, it is desirable to include a coupling agent to compatibilize the interface between the non-black fillers and the polymers. Desirable amounts of carbon black, when present, are from about 5 to about 250 phr.

Curative

Another additive is a curative, which crosslinks (vulcanizes) the crosslinkable rubber phase. The type of curative used in this disclosure depends on the type of rubber to be crosslinked. The curatives for each type of rubber are generally conventional for those rubbers in thermoplastic vulcanizates and also generally useful in conventional amounts. The curatives include, but are not limited to, phenolic resin curatives and sulfur curatives (with or without accelerators), accelerators alone, peroxide curatives, hydrosilation curatives using silicon hydride and platinum or peroxide catalyst, etc. Preferably, when the rubber component is an EPM, a peroxide curative is used.

The amount of curative used to prepare a first component TPV in the present invention may be readily determined by those of skill in the art based on (1) the type of curative, (2) the desired cure state of the rubber and (3) the amount and type of rubber present.

Additive Oil

The term "additive oil" is defined herein to include both "process oils" and "extender oils," and each of those terms is defined herein in accordance with the broadest definition or usage of that term in any issued patent or publication. For example, extender oils include a variety of hydrocarbon oils and also include certain plasticizers (e.g., ester plasticizers). In an illustrative TPV, an additive oil can be present in amounts from about 5 to about 300 parts by weight per 100 parts by weight of the blend of rubber and thermoplastic components. The amount of additive oil may also be expressed as from about 30 to 250 phr, and more desirably from about 70 to 200 phr. Many additive oils are derived from petroleum fractions, and have particular ASTM designations depending on whether they fall into the class of paraffinic, naphthenic, or aromatic oils. Other types of additive oils, which can be used in the TPVs herein, are alpha olefinic synthetic oils, such as liquid polybutylene, e.g., products sold under the trademark Parapol®. The type of additive oil utilized will be that customarily used in conjunction with a particular rubber component. The ordinarily skilled chemist will recognize which type of oil should be used with a particular rubber, and also be able to determine the amount (quantity) of oil. The quantity of additive oil can be based on the total rubber content, and defined as the ratio, by weight, of additive oil to total rubber in the TPV, and that amount may in certain cases be the combined amount of process oil (typically added during processing) and extender oil (typically added after processing). The ratio may range, for example, from about 0 to about 4.0/1. Other ranges, having any of the following lower and upper limits, may also be utilized in a TPV: a lower limit of 0.4/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both. Additive oils other than petroleum based oils can be used also, such as oils derived from coal tar and pine tar, as well as synthetic oils, e.g., polyolefin materials (e.g., Nexbase™, supplied by Fortum Oil N.V.). Examples of plasticizers that are often used as additive oils are organic esters and synthetic plasticizers. Certain rubber components (e.g., EPDMs, such as Vistalon 3666) include additive oil that is preblended before the rubber component is combined with the thermoplastic.

Second Component (Grafted Propylene-Based Elastomer)

In certain embodiments of the present invention, the second component comprises a grafted propylene-based elastomer.

The propylene-based elastomers of the present invention are semi-crystalline and can be prepared by polymerizing propylene with primary comonomers including, but not limited to, ethylene or higher alpha-olefins in the presence of a transition metal catalyst with an activator and optional scavenger. The crystallinity of the propylene-based elastomer arises predominantly from crystallizable stereoregular propylene sequences. Comonomers or propylene insertion errors separate these sequences. While syndiotactic configuration of the propylene is possible, polymers with isotactic configurations are preferred.

The transition metal catalyst may be a metallocene or a non-metallocene as disclosed in WO03/040201. The comonomer used with propylene may be linear or branched. Linear alpha-olefins include, but are not limited to ethylene, and $C_4$-$C_{20}$ a-olefins such as 1-butene, 1-hexene, and 1-octene. Branched alpha-olefins include, but are not limited to, 4-methyl-1-pentene, 3-methyl-1-pentene, and 3,5,5-trimethyl-1-hexene. The olefin comonomer is present in the grafted propylene-based elastomer within a range having an upper limit of 30.0 wt %, 28.0 wt %, 25.0 wt %, 15 wt %, 10 wt %, 5 wt % or 2.5 wt % and a lower limit of 0.1 wt %, 0.3 wt %, 0.5 wt %, 1.0 wt %, 1.2 wt % or 1.5 wt %, based on the total weight of the grafted propylene-based elastomer.

The use of a chiral transition metal catalyst ensures that the methyl groups of the propylene residues have predominantly the same tacticity. For the polymers of the present invention the low levels of crystallinity in the propylene-based elastomers are derived from isotactic polypropylene obtained by incorporating alpha-olefin comonomers as described above. The propylene-based elastomer of the invention can have a heat of fusion within the range having an upper limit of 75, 65, 55, 50, 40, 30, 25, 20, or 15 J/g and a lower limit of 0.5, 1, or 5 J/g.

The crystallinity of the propylene-based elastomer can also be expressed in terms of crystallinity percentage. The thermal energy for the highest order of polypropylene is estimated at 189 J/g. That is, 100% crystallinity is equal to 189 J/g. Therefore, according to the aforementioned heat of fusion values, the propylene-based elastomer of the invention can have a polypropylene crystallinity within the range having an upper limit of 40%, 35%, 29%, 26%, 21%, 16%, 13%, 11% or 8% and a lower limit of 0.05%, 0.5%, or 2.5%. The propylene-based elastomer preferably has a single broad melting transition. Typically a sample of the polymer will show secondary melting peaks adjacent to the principal peak, which may be considered together as a single melting point. The highest of these peaks is considered the melting point ("$T_{max}$"). The propylene-based elastomer of the invention can have a melting point within the range having an upper limit of 105° C., 95° C., 85° C., 75° C., 65° C., or 60° C. and a lower limit of 20° C., 25° C. or 30° C. The weight average molecular weight of the propylene based elastomer can be within the range having an upper limit of 5,000,000 daltons, or 500,000 daltons and a lower limit of 10,000 daltons, or 80,000, with a MWD within the range having an upper limit of 40, 5 or 3 and a lower limit of 1.5 or 1.8.

In some embodiments, the propylene-based elastomer has a MI of from a lower end of 0.1 dg/min, 1.0 dg/min, 1.5 dg/min, 2.5 dg/min or 5.0 dg/min to an upper end of 10 dg/min, 15 dg/min, 25 dg/min, 35 dg/min or 50 dg/min or anywhere in between. In some embodiments, the propylene-based elastomer can have a Mooney viscosity ML (1+4)@125° C. less than 100, less than 75, less than 60 or less than 30.

In one embodiment, the propylene-based elastomer of the invention comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described in WO02/083753. Typically, approximately 75% or 85% by weight of the polymer is isolated as one or two adjacent, soluble fractions with the balance of the polymer in immediately preceding or succeeding fractions. Each of these fractions has a composition (wt % ethylene content) with a difference of no greater than 20% (relative) and more preferably 10% (relative) of the average weight percent ethylene content of the polypropylene copolymer. The propylene-based elastomer has a narrow compositional distribution if it meets the fractionation test criteria outlined above.

In one embodiment, the length and distribution of stereoregular propylene sequences in the propylene-based elastomers of the invention is consistent with substantially random statistical copolymerization. It is well known that sequence length and distribution are related to the copolymerization reactivity ratios. By substantially random, it is meant a copolymer for which the product of the reactivity ratios is generally 2 or less. In stereo-block structures, the average length of polypropylene sequences is greater than that of substantially random copolymers with a similar composition.

Prior art polymers with stereo-block structure have a distribution of polypropylene sequences consistent with these blocky structures rather than a random substantially statistical distribution. The reactivity ratios and sequence distribution of the polymer may be determined by $^{13}$C-NMR which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor, which allows only a single polymerization environment for substantially all of the polymer chains of the polypropylene copolymer.

Preferred methods for producing the propylene-based polymer backbones are found in U.S. Patent Application Publication No. 2004/0236042 and U.S. Pat. No. 6,881,800, which are incorporated by reference herein.

In another embodiment, the propylene-based polymer can include copolymers prepared according the procedures in WO 02/36651 which is incorporated by reference here. Likewise, the propylene-based polymer backbone can include polymers consistent with those described in WO 03/040201, WO 03/040202, WO 03/040095, WO 03/040201, WO 03/040233, and/or WO 03/040442. Additionally, the propylene-based polymer can include polymers consistent with those described in European Patent No. 1 233 191, and U.S. Pat. No. 6,525,157, along with suitable propylene homo- and copolymers described in U.S. Pat. No. 6,770,713 and U.S. Patent Application Publication No. 2005/0215964, and WO 2006/101966 all of which are incorporated by reference. The propylene-based polymer backbone can also include one or more polymers consistent with those described in European Patent Nos. 1,614,699; 1,017,729; 1,561,762 or 1,002,809.

Graft Comonomers

The propylene-based elastomers of the present invention are grafted with a graft comonomer, such as, but not limited to, ethylenically unsaturated carboxylic acids or acid derivatives or epoxides.

Examples of acid derivatives suitable for use in the present invention include acid anhydrides, esters, salts, amides, imides, and the like. A particularly preferred acid derivative is maleaic anhydride ("MAH"). Other suitable graft comonomers of this type include, but are not limited to the following: acrylic acid, methacrylic acid, maleic acid, fumaric acid, itaconic acid, citraconic acid, mesaconic acid, crotonic acid, maleic anhydride, 4-methyl cyclohex4-ene-1,2-dicarboxylic acid anhydride, bicyclo(2.2.2)oct-5-ene-2,3-dicarboxylic acid anhydride, 1,2,3,4,5,&6-lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride ("XMNA"). As used herein, the term "graft" or "grafting" denotes covalent bonding of the graft comonomer to a polymer chain of the propylene-based elastomer.

Certain suitable epoxide graft comonomers may be described as a monovalent group of the general formula:

Formula I

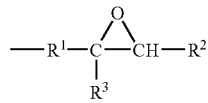

wherein $R^3$ is hydrogen or methyl; $R^2$ is hydrogen or $C_1$-$C_6$ alkyl; and $R^1$ is $C_1$-$C_{10}$ alkylene. Preferably $R^1$ is methylene, $R^2$ is hydrogen and $R^3$ is hydrogen (i.e. glycidyl). The above epoxide graft comonomer of Formula I may be joined to the alpha-beta ethylenically unsaturated portion of the propylene-based elastomer backbone through any number of organic groups including a carbon-to-carbon bond, though an amide group, through an ether linkage or through an ester linkage. Suitable epoxide graft comonomers are glycidal esters of unsaturate alcohols, glycidal esters of unsaturated carboxylic acids, glycidal esters of alkenylphenols, vinyl and allyl esters of expoxy carboxylic acids and vinyl esters of expoxidized oleic acid. A particularly preferred epoxide graft comonomer is glycidyl methacrylate ("GMA"). Other suitable grafting comonomers of these types include, but are not limited to the following: glycidyl acrylate, allyl-glycidal ether, methallyl-glycidal ether, glycidyl-2-ethyl acrylate, glycidyl-2-propyl acrylate, and isopropenylphenyl-glycidyl ethers.

Other examples of epoxide functional graft comonomers suitable for use in at least one embodiment of the present invention may be generally described as $C_1$-$C_8$ alkyl esters derivatives of unsaturated carboxylic acids. Some of these comomers include, but are not limited to, methyl acrylate, methyl methacrylate, ethyl acrylate, ethyl methacrylate butyl acrylate, butyl methacrylate monoethyl maleate, diethyl maleate, monomethyl fumarate, dimethyl fumarate monomethyl itaconate and diethyle itaconate. The graft comonomers suitable for use in the present invention may also be a mixture of more than one of any of the above described graft comonomers.

Generally the compatibilizing effect between the first component and the third component is influenced by the level of grafting in the propylene-based elastomer. The propylene-based elastomers may be grafted to a higher degree. The grafting level is within the range having an upper limit of 10.0 wt %, 5.0 wt %, 2.0 wt %, 1.6 wt %, 1.5 wt % or 1.0 wt % and a lower limit of 0.1 wt %, 0.3 wt %, 0.5 wt % or 0.6 wt %, based on the total weight of the grafted propylene-based elastomer.

Certain suitable grafted propylene-based elastomers are described in U.S. Pat. No. 6,884,850, which is incorporated by reference herein for all jurisdictions where such incorporation is permitted.

Third Component (Flock)

The third component of the present invention may take the form of a film, layer, particle, fiber or other form known to those of skill in the art.

When the third component is a fiber or particle, it may be alternatively referred to as "flock." As is well known, flock may generally be described as particle or short or pulverized fiber used to form a velvety surface on a material such as a metal, rubber or TPE surface. To flock a surface, the flock is at least partially adhered to the surface such that at least a portion of the flock fiber or particle is exposed on or above the now-flocked surface. The remainder of the flock may adhered to the surface itself, or adhered and embedded within the surface. When "adhere(d)" is used herein with reference to a flock, it is meant to include both adhered to a surface and adhered and embedded within a surface.

If the flock is a fiber, the fibers will preferably have a shortest length of from 0.1 mm, 0.5 mm, 0.7 mm or 0.75 mm to a longest length of 1.25 mm, 1.5 mm, 2.5 mm or 5.0 mm, or anywhere in between. Fiber flocks of the present invention will preferably have a fineness range of from 0.1 decitex, 0.25 decitex, 0.5 decitex or 0.75 decitex on the low end to 1.5 decitex, 1.75 decitex, 2.5 decitex, 3.0 decitex, 3.3 decitex or 5.0 decitex on the high end, or anywhere in between. Each fiber need not be the same length, nor the same fineness. A mixture of fibers suitable for the present invention (whether of one or more materials) may contain fibers of more than one length and fineness, but are preferably maintained within a desired range of length and fineness for consistency of the flock in the final product.

In the present invention, the flock may serve to reduce the friction that would exist between the first component or second component and materials to which they may come in contact in the absence of the flock. Suitable flock materials are well known to those of skill in the art, any of which may be used in the present invention, and include, but are not limited to polar and/or non-polar materials, more preferably polyamides, polyesters, acrylics, rayon and mixtures thereof. Preferred flock materials are polyamides and polyesters, the former being more preferred.

Polyamides

Polyamides suitable for use in the present invention are high molecular weight polymers containing amide ($—CONH_2$) groups and are usually made by condensation of a carboxylic acid and a polyfunctional amine. Alternatively, the polyamide may be a urea-formaldehyde resin obtained by the condensation of formaldehyde and urea. The preferred polyamide is nylon, which is obtained by the condensation polymerization of the salt resulting from the reaction of adipic acid with hexamethylene diamine. The polymers obtained usually have molecular weights greater than 10,000 daltons, melting temperatures of about 263° C., specific gravities of about 1.14, tensile strengths of about 13,000 PSI (89,625 kPa) and compressive strengths of about 11,000 PSI (75,845 kPa). Preferred nylons include, but are not limited to, nylon 6, nylon 9, nylon 6,6, nylon 5,10, and nylon 6,12. Most preferred of these is nylon 6,6.

Polyesters

Polyesters suitable for use in the present invention are any of the linear or branched saturated polyesters known to those of skill in the art. Generally, the polyesters comprise linear saturated polyesters derived from $C_1$-$C_{10}$ alkyleneglycols such as ethylene glycol, propylene glycol and 1,4-butanediol, including cycloaliphatic glycols, such as 1,4-cyclohexanedimethanol and mixtures of any of these glycols with one or more aromatic dicarboxylic acids. Preferably, the polyesters comprise poly($C_1$-$C_6$ alkylene terephthalates) prepared by known techniques, such as the transesterification of esters of terephthalic acid alone or mixtures of esters of terephthalic acid and isophthalic acid, with the glycol or mixture of glycols and subsequent polymerization, by heating the glycols with the free acids or with halide derivatives thereof, and similar processes. These methods are described in U.S. Pat. Nos. 2,465,319 and 3,047,539, incorporated by reference herein. In addition, blends of one or more of these polyesters or copolyesters may be employed. A suitable poly(1,4-butylene terephthalate) resin is commercially available from General Electric Company under the tradename VALOX® 315. Poly(ethylene terephthalate) resins are also well known and commercially available.

Adhesive Component

The adhesive component may be any adhesive known to those of skill in the art for adhering low friction, polar materials (such as the flock described above) to non-polar ones (such as the first components described above). The adhesive component preferably comprises a solvent- or water-based adhesive, preferably water-based. Preferably, the adhesive component and/or the adhesive is substantially solvent free. "Substantially solvent free" includes the virgin state of the adhesive component and those mixtures of adhesive component and solvent containing less than 10%, 5%, 3%, 2%, 1% or 0.5% by total weight of the mixture solvent. In some embodiments "substantially solvent free" means about 0% solvent. The adhesive may be comprised of a polyurethane, acrylic, chloroprene-based adhesives, neoprene-based adhesives, and mixtures thereof, but are most often polyurethane-based. In certain embodiments where an adhesive later is present, water-based polyurethane adhesives are preferred. Suitable water-based polyurethane adhesives are described in United States Patent Publication No. 2006/0160943, incorporated by reference herein. Other suitable water-based polyurethane adhesives are available under the trademarks Mor-Flock™ and Polyflock™ from Rohm & Hass.

Methods

Co-Extrusion

In a primer/adhesive system, the primer is normally sprayed or brushed on the profile surface that has been previously activated to obtain the best adhesion. Activation can be a mechanical abrasion, or electrical discharge treatment like corona or plasma. Then the adhesive is sprayed or brushed on.

In aspects of the current invention, the flock is applied to the second component or adhesive component by means of flocking processes well known to those of skill in the art, including, but not limited to, mechanical and electrostatic flocking or a combination of both.

In at least one embodiment of the present invention, the flocking is accomplished via eletrostatic flocking. Generally, electrostatic flocking is a process by which the flock material is electrically charged, thus causing the flock fibers to stand on end. The material to be flocked is grounded by means of a grounding electrode. The charged fibers are then propelled toward the grounded material such that the fibers embed themselves in material at an angle, preferably near right angles, to the surface of the material. Control of the electrical field between the charged flock and grounded substrate provides regulation of the density and speed of the flock. The flock is applied under electrical field under 70 KV. The adhesive viscosity is such that the flock penetrates at least the adhesive layer and stands straight. Then the system must be cured in hot air or infra red oven to develop the adhesion between the flock fiber, the adhesive and the substrate.

Coextrusion

In one embodiment of the invention, the adhesive layer and the substrate are coextruded through the same die, such that the layers are melt-fused by the material temperature at the die exit (about 180° C.), without the need for any surface preparation or expensive and time consuming primer/adhesive application processes. The adhesive layer has average thickness of 100 micrometer, comprised between 50 and 150 micrometer. The temperature of the adhesive layer is critical to obtain the right viscosity and allow a good penetration of the flock fiber in the adhesive layer. It must be higher than 100° C. After the flock application, the composition must go through a hot air or infra red oven to generate the chemical reaction between the adhesive layer and the flock fiber. This temperature must be higher than 100° C., preferably over 110° C. and most preferably over 120° C. during 1 minute. At the exit of the oven the composition is cooled down by water spray and the flock has a good adhesion to the adhesive layer such as operator handling can be made without risk of damaging the flock layer.

Emulsion Spray

In a second embodiment of the invention, the adhesive material is in the form of a water emulsion that is pre-mixed in the commercial water-based adhesive. Then, the composition in sprayed or brushed onto the elastomeric substrate. Preferably, the surface temperature of the substrate is cooled well below the boiling temperature of the water before applying the water based adhesive to prevent vaporization of the water at the contact of the hot substrate and obtain a smooth uniform surface of adhesive. This application temperature should be below 80° C., preferably below 60° C. and most preferably below 50° C. After the flock application, the composition must go through a hot air or infra red oven to cure the adhesive and develop the adhesion with the flock fiber. This temperature must be higher than 100° C., preferably over 110° C. and most preferably over 120° C. during 1 minute. At the exit of the oven, the composition is cooled down by water spray and the flock has a good adhesion to the substrate such as operator handling can be made without risk of damaging the flock layer.

Applications

In an embodiment, the present invention envisions shaped parts and articles formed from composite structures described above The shaped parts and articles are useful as elastomeric polymer profiles generally for use as vehicle sealing systems, especially glass run channels, door seals, belt line seals, body side moldings, sunroof moldings and windshield moldings.

Also included in the present invention is the use of these shaped parts and articles for sealing systems in vehicles. Vehicles contemplated include, but are not limited to, passenger automobiles, trucks of all sizes, farm vehicles, trains and the like.

Further, the present invention encompasses the fabrication of glass run channels, door seals or belt line seals which may include coloring, low friction coatings, thermoplastic veneers or thermoplastic overmoldings. The resulting sealing systems have combinations of properties rendering them superior and unique to systems previously available.

As discussed above, in at least one embodiment, the present invention is a flocked film or tape. In this embodiment, the second component is often coextruded with a thermoplastic, preferably polypropylene or polyethylene, film. The second component being at least partially adhered to a first surface of the thermoplastic film. The third component is then at least partially adhered to the second component as described above. Optionally, an adhesive (pressure-sensitive, heat-activated or other) may be applied to the second surface of the film. The film may then be cut to form a tape or ribbon. The flocked films and tapes of the present invention can be used in noise attenuating devices, automotive interior surfacing, automotive and industrial belts and hoses, packaging (in decorative and protective applications), construction materials, decorative building materials and consumer goods such as handbags, backpacks, clothing, hand or power tools, drawer and cabinet liners, picture frames and hunting decoys.

In yet other embodiments, the present invention includes:

1. A composite structure comprising: a first component; a second component comprising a grafted propylene-based elastomer comprising propylene-derived monomer units; and from 0.1 to 10 wt %, based on the weight of the grafted propylene-based elastomer, graft comonomer units; wherein, the grafted propylene-based elastomer has a heat of fusion of less than 75 J/g and a $T_m$ of less than 105° C.; and a third component comprising a polar material, wherein the third component is at least partially adhered to the second component and the second component is at least partially adhered to the first component.

2. The composite structure of embodiment 1, wherein the propylene-based elastomer is a copolymer comprising from 0.1 to 30 wt %, based on the weight of the grafted propylene-based elastomer, primary comonomer units.

3. The composite structure of embodiment 1, wherein the first component comprises a rubber and a thermoplastic resin.

4. The composite structure of embodiment 3, wherein the rubber is selected from the group consisting of ethylene-propylene rubber (EPR), ethylene-propylene-diene rubber (EPDM), butyl rubber, homopolymers of a conjugated diene, copolymers of at least one conjugated diene with an aromatic monomer, copolymers of at least one conjugated diene with a polar monomer, unsaturated non-polar elastomers, natural rubber, polyisoprene, polybutadiene elastomer, styrene-butadiene elastomer and mixtures thereof; and the thermoplastic resin is selected from the group consisting of crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

5. The composite structure of embodiment 4, wherein the thermoplastic resin is polypropylene.

6. The composite structure of any one of embodiments 1 through 5, wherein the primary comonomer units derived from any of $C_2$ or $C_4$-$C_{20}$ alpha olefins.

7. The composite structure of embodiment 5, wherein the primary comonomer units are derived from ethylene and the grafted propylene-based elastomer has a heat of fusion of less than 50 J/g.

8. The composite structure of embodiment 1, wherein the graft comonomer units are derived from the group consisting of carboxylic acids, carboxylate anhydrides, carboxylate esters, carboxylate amides, carboxylate imides, metal carboxylate salts, epoxides, $C_1$-$C_8$ alkyl esters, $C_1$-$C_8$ glycidyl esters and mixtures thereof.

9. The composite structure of embodiment 1, wherein the graft comonomer units are derived from the group consisting of acrylic acid, methacrylic acid, maleic acid, fumaric acid, itaconic acid, acrylic anhydride, methacrylic anhydride, maleic anhydride, fumaric anhydride, itaconic anhydride, glycidyl methacrylate, glycidyl acrylate, allyl-glycidal ether, methallyl-glycidal ether, glycidyl-2-ethyl acrylate, glycidyl-2-propyl acrylate, isopropenylphenyl-glycidyl ethers and mixtures thereof.

10. The composite structure of claim 1, wherein the third component is a fiber, the fiber having a length of from 0.1 mm to 5.0 mm and a fineness of from 0.1 decitex to 5.0 decitex.

11. The composite structure of embodiment 10, wherein third component is selected from polyamides, polyesters, acrylics, rayon and mixtures thereof.

12. The composite structure of embodiment 11, wherein third component is selected from nylon, poly($C_1$-$C_6$ alkylene) terephthalates and mixtures thereof.

13. The composite structure of any of embodiments 1-12, wherein the graft comonomer units are present in the amount of from 0.1 wt % to 5.0 wt % based on the weight of the grafted propylene-based elastomer.

14. The composite structure of any of embodiments of 1-13, wherein the graft comonomer units are present in the amount of from 0.3 wt % to 1.5 wt % based on the weight of the grafted propylene-based elastomer.

15. The composite structure of any of embodiments of 1-14, wherein the graft comonomer units are present in the amount of from 0.5 wt % to 1.5 wt % based on the weight of the grafted propylene-based elastomer.

16. The composite structure of any of embodiments 1-15, wherein the grafted propylene-based elastomer has a melt index according to ASTM D1238 at 190° C. and 2.16 kg weight of from 0.1 dg/min to 50 dg/min.

17. The composite structure of any of embodiments 1-16, wherein the grafted propylene-based elastomer has a melt index according to ASTM D1238 at 190° C. and 2.16 kg weight of from 1.0 dg/min to 25 dg/min.

18. The composite structure of any of embodiments 1-17, wherein the rubber is at least partially vulcanized.

19. The composite structure of any of embodiments 1-18, wherein the original Renault adhesion rating is of from 2 to 4+.

20. The composite structure of any of embodiments 1-19, wherein the cataplasm heat aged Renault adhesion rating is of from 3 to 4+.

21. The composite structure of any of embodiments 1-20, wherein the original Renault adhesion rating is of from 1 to 4+ and the cataplasm heat aged Renault adhesion rating is of from 3 to 4+.

22. A shaped article comprising the composite structure of any of embodiments 1-21.

23. The shaped article of any of embodiments 1-21, wherein the shaped article is selected from automotive weather seals, glass run channels, a noise attenuating device, automotive interior part, automotive belt, automotive hose, industrial belt, industrial hose, packaging material, construction material, decorative building material, handbag, backpack, clothing article, hand or power tool, drawer or cabinet liner, picture frame or hunting decoy.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

Further, with respect to all ranges described herein, any bottom range value may be combined with any upper range value to the extent such combination is not violative of a basic premise of the range described (i.e., lower and upper ranges of weight percents components are present in a composition may not be combined to the extent they would result in more than 100 weight percent in the overall composition).

EXAMPLES

Samples of Santoprene® 121-67W175 were coextruded with malaic anhydride-grafted Vistamaxx 3000, the Vistamaxx 3000 having an MFR (190° C./2.16) of 25 dg/min, and a total amount of grafting of 0.75 wt %. This is followed by addition of a polyamide (Polyamid 3.3 dtex, length 0.3-1.8 mm black, semi-dull ex Swissflock AG.) flocking layer and flocking via electrostatic discharge, followed by heating in an oven (IR lamps) to initiate the reaction with the flock. Typical conditions used throughout the examples herein are: voltage of 70 kV, primer temperature of 160° C., Adhesive temperature of 40° C., start curing temperature of 23° C., middle curing temperature of 116° C., end curing temperature of 129° C., and curing time of 3.2 m/min. These were tested against the same Santoprene having the flocking layer adhered with an adhesive and primer. The data for these experiments are in Table 1. "PP-Cl" is chlorinated polypropylene used as a primer. The Polyurethane is either Polyflock 97 (PU 1), which is a methyl-isobutyl ketone based polyurethane adhesive, or a water based polyurethane adhesive (PU 2). The Adhesion performance was measured as follow: specimens were cut from the extruded flocked profile having a length of 70 mm long by 10 mm width. The samples are fixed on the AGP 1000 Abrasion Tester from Maag—Germany by a double side tape. The wearing tool is composed of a 0.5 mm diameter piano cord, laying perpendicular to the sample. A weight of 500 g is applied onto the wearing tool. The test is carried out by a double rubbing over 500 cycles at room temperature. The results are expressed by a visual rating from 0 (all the flock fibers have been rubbed out and the TPE substrate is totally visible) to 5 (all the flock is left on the specimen, no trace of flock wear/abrasion). This is based on the PSA D 24 1724 modified (by EMC laboratory). This test can be duplicated at certified laboratories like Servam in Belgium.

The test carried out on original material, and aged specimen in water (4 days at 90° C.) and saturated humidity environment (7 days at 70° C.). The compositions of the invention have no visual wearing after 500 cycles, exceeding the reference water based adhesive. To address the service life of the invention in hot weather conditions, we tested the specimen at 50° C.: it performed better than the reference. Assessing a long service life, the abrasion test continued up to 5000 cycles (10 times the specification) with success, without visible wear, meeting the specification target.

The results are expressed by a visual rating from 1 (no adhesion=no flock left on the substrate) to 5 (no visible degradation).

TABLE 1

Results of first test using MA-g-VMX having MFR of 25 dg/min.

| Sample | Primer/Adhesive Layer | Adhesion original rating | Adhesion cataplasm aged rating |
|---|---|---|---|
| 1 | PP-Cl/PU-1 | 2+ | 2 |
| 2 | PP-Cl/PU-2 | 3 | 2 |
| 3 | MA-g-VMX | 5 | 5 |

In a second set of experiments, samples of Santoprene® 121-67W175 were coextruded with three different grafted Vistamax 3000 substrates: malaic anhydride-grafted Vistamaxx 3000, the Vistamaxx 3000 having an MFR (190° C./2.16) of 25 dg/min, and a total amount of grafting of 0.75 wt % (VMX 1); epoxy-grafted Vistamaxx 3000 with an MFR of 2.4 and 0.6 wt % of total grafting (VMX 2); and another epoxy-grafted Vistamaxx 3000 with an MFR of 3 and 1.2 wt % of total grafting (VMX 3). This is followed by addition of a polyamide flocking layer and flocking via electrostatic discharge, followed by heating in an oven (IR lamps) to initiate the reaction with the flock. These were tested against the same Santoprene having the flocking layer adhered with an adhesive and primer. The data for these experiments are in Table 2. "PP-Cl" is chlorinated polypropylene used as a primer. The Polyurethane is either Polyflock 97 (PU 1), which is a methyl-isobutyl ketone based polyurethane adhesive, or a water based polyurethane adhesive (PU 2).

TABLE 2

Results of first test using MA-g-VMX and epoxy-g-VMX.

| Sample | Primer/Adhesive Layer | Adhesion original rating | Adhesion cataplasm aged rating |
|---|---|---|---|
| 4 | PP-C1/PU 1 | 2 | 2 |
| 5 | PP-C1/PU 2 | 2 | 1+ |
| 6 | VMX 3/PU 2 | 3 | 3 |
| 7 | VMX 2/PU 2 | 2+ | 3 |
| 8 | VMX 1/PU 2 | 4+ | 4− |

In a third set of experiments, samples of Santoprene® 121-67W175 were coextruded with three different grafted Vistamax 3000 substrates: maleic anhydride-grafted Vistamaxx 3000, the Vistamaxx 3000 having an MFR (190° C./2.16) of 25 dg/min, and a total amount of grafting of 0.75 wt % (VMX 1); a maleic anhydride grafted Vistamaxx blend (one polymer having an ethylene content of 11 wt % and the other an ethylene content of 5 wt %) having an average ethylene content of 8 wt %, and MFR (190° C., 1.26 kg) of 30 dg/min and an MA content of 0.7 wt %. (VMX 4); a propylene-co-ethylene polymer EXP0557.E water-based emulsion with an anionic surfactant from Michelman International (VMX 5); another propylene-co-ethylene polymer EXP0556.E water-based emulsion with a non-anionic surfactant from Michelman International (VMX 6). VMX 5 and VMX 6 are painted or otherwise applied to the first layer or substrate surface, while the VMX 4 is co-extruded. This is followed by addition of a polyamide flocking layer and flocking via electrostatic discharge, followed by heating in an oven (IR lamps) to initiate the reaction with the flock. The data for these experiments are in Table 1. These were tested against the same Santoprene having the flocking layer adhered with an adhesive and primer. The data for these experiments are in Tables 3-5. "PP-Cl" is chlorinated polypropylene. The Polyurethane is either Polyflock 97 (PU 1), which is a methyl-isobutyl ketone based polyurethane adhesive, or a water based polyurethane adhesive (PU 2); or Polyflock 9825A activator diisocyanate in hexamethylene (PU 3).

The wax peel test is carried out as follows: The flocked TPE sample is cut on a 150 mm long and a width of 10 mm. A mold is set on top of the profile sample, flocked portion up, in which a molten wax (reference Red Pelikan 36A 196 from Gunther Wagner—Germany) was blown at a temperature of 150° C. The thickness of the wax comprised between 5 and 8 mm. The sample is laid for 2 hours at room temperature for a complete cooling and full adhesion development on the flock fibers. Then the specimen is ready for adhesion testing by peeling at 90° with a tensometer. One fixation is the wax edge, free of flocked TPE, the other edge being the TPE portion, free of wax. The peeling is done at a speed of 100 mm/minute. Results are reported as an average of 5 sample. The flock must stay on the wax to validate the result. Results are expressed in N/mm. The Daimler Chrysler Mercedes specification DBL 5575 requires a minimum of 1.6 N/mm for the quality "−10" and 2.0 N/mm for the quality "−20", depending on the position of the seal in the car and the severity of the application. The Inventive samples are compared to a reference commercial glass run channel, EPDM based and flocked, currently mounted on the Mercedes Class A, in Table 3.

TABLE 3

| | | | | | Wax peel DBL 5575 | |
|---|---|---|---|---|---|---|
| Sample | Base layer | co-extruder grafted VMX layer | Primer | adhesive | @ RT - N/10 mm | N/mm spec.: 5575.10 > 1.6 5575.20 > 2.0 |
| 9 | Santoprene 121-67W175 | — | Polyprime 9279 | Polyflock X 9810 A2 | 17.4 | 1.7 |
| 10 | Santoprene 121-67W175 | VMX 1 | — | — | 50.1 | 5.0 |
| 11 | Santoprene 121-67W175 | VMX 4 | — | — | 32.4 | 3.2 |
| Commercial Glass Run Channel EPDM Mercedes Class A | | | | | 29.9 | 3.0 |

In this series of adhesion tests, it was observed that the current water based adhesive system (9) is borderline within the specification, with lower adhesion performance than the current EPDM solution commercialized for automotive uses. The invention offers a higher flock fiber adhesion performance than the reference, in particular composition 11 based on VMX 4 layer (a maleic anhydride grafted Vistamaxx having an ethylene content of 5 wt %, and MFR (190° C., 1.26 kg) of 30 dg/min and an MA content of 0.7 wt %).

To better address the scope of the invention for automotive glass run channel that can be exposed in hot temperature in extreme climate, the flock adhesion up to 100° C. was tested. The composition of the invention provides such an elasticity of the binding layer that no cracks appear up to 90° C. with sample 11, which is far better than the commercial water based adhesive.

TABLE 4

Water-based primer examples

| Sample | Base Layer | Primer | Adhesive | Wax Peel DBL 5575 @ RT-N/10 mm | N/mm spec: 5575.10 > 1.6 5575.20 > 2.0 |
|---|---|---|---|---|---|
| 12 | Santoprene 121-67W175 | Polyprime 9279 | Polyflock X 9810A2 | 17.4 | 1.7 |
| 13 | Santoprene 121-67W175 | VMX5 | Polyflock X 9810A2 | 25 | 2.5 |
| 14 | Santoprene 121-67W175 | VMX6 | Polyflock X 9810A2 | 3.9 | 0.4 |

The experimental emulsion 13 is sprayed on top of the hot TPE profile, before receiving the commercial water based adhesive. The sample 12 passes the specification with similar adhesion performance as the commercial glass run channel in Table 3.

TABLE 5

Mono-component approach:
Modified water based adhesive with g-VMX

| Sample | Base Layer | Primer | Adhesive | Wax Peel DBL 5575 @ RT-N/10 mm | N/mm spec: 5575.10 > 1.6 5575.20 > 2.0 |
|---|---|---|---|---|---|
| 15 | Santoprene 121-67W175 | — | Polyflock X 9825A | 3.7 | 0.4 |
| 16 | Santoprene 121-67W175 | — | Polyflock X 9810 A2/VMX 6 | 7.1 | 0.7 |
| 17 | Santoprene 121-67W175 | — | Polyflock X 9810 A2/VMX 5 | 8.2 | 0.8 |

The pre-blend of the water based commercial adhesive with the experimental emulsion of grafted VMX does not provide the expected flock adhesion performance.

The flock layer resistance to temperature was measured by exposure to the various temperatures in Table 6 and visually observing the samples. The flock adhesion testing results are in Tables 7 and 8.

TABLE 6

Flock layer resistance to heat: visual observations

| Sample | Primer/Adhesive Layer | 60° C. | 70° C. | 80° C. | 90° C. | 100° C. |
|---|---|---|---|---|---|---|
| 9 | PP-C1/PU2 | Some cracks | Some cracks | cracks | Cracks | Cracks + minimal force to peel |
| 10 | VMX 1 | no cracks | no cracks | Layer can be deformed | Sticky surface-flock disappeared in VMX layer | Sticky surface-flock disappeared in VMX layer |

TABLE 6-continued

Flock layer resistance to heat: visual observations

| Sample | Primer/Adhesive Layer | 60° C. | 70° C. | 80° C. | 90° C. | 100° C. |
|---|---|---|---|---|---|---|
| 11 | VMX 4 | no cracks | no cracks | no cracks | no cracks | Layer can be deformed |

TABLE 7

Flock adhesion after 500 cycles, double rub test, 0.5 mm wire, 500 g load

| Sample | Primer/Adhesive Layer | Original 25° C. | Cataplasm aged (7 days @ 70° C. | Water aged (4 days at 90° C.) | 50° C. |
|---|---|---|---|---|---|
| 9 | PP-C1/PU2 | 4 | 4 cracks | 3 cracks | 3 to 1, adhesive layer destroyed |
| 10 | VMX 1 | 5 | 5 | 5 | 4 - no cracks/no delamination |
| 11 | VMX 4 | 5 | 5 | 5 | 4 - no cracks, no thermal effect |
| 12 | VMX 5/PU 2 | 4 | 3 small cracks | 2 small cracks | 4-adhesion good, flock density not sufficient compared to reference |
| 13 | VMX 6/PU 2 | 4 | 3 small cracks | 1 small crack | 4-adhesion good, flock density not sufficient, some cracks, increased rigidity |
| 14 | PU 3 | 3.5 | 4 | 4 cracks | 1-cracks in adhesive layer |
| 15 | VMX 6/PU 2 (10/90 blend together) | 4 | 3 cracks | 2 cracks | 4-adhesion good, flock density not sufficient, some cracks, increased rigidity |
| 16 | VMX 5/PU 2 (10/90 blend together) | 4 | 3 cracks | 2 cracks | 4-adhesion good, flock density not sufficient, some cracks, increased rigidity |

TABLE 8

Flock adhesion rating, double rub test, 0.5 mm wire, 500 g load, by number of rubbing cycles

| Sample | Primer/Adhesive Layer | 500 | 1000 | 2000 | 5000 |
|---|---|---|---|---|---|
| 9 | PP-C1/PU2 | 4 | 3 | 0 | — |
| 10 | VMX 1 | 5 | 5 | 5 | 5 |
| 11 | VMX 4 | 5 | 5 | 5 | 4+ |

What is claimed is:

1. A composite structure comprising:
   a. a first component;
   b. a second component comprising a grafted propylene-based elastomer comprising
      i. propylene-derived monomer units; and
      ii. from 0.1 to 10 wt %, based on the weight of the grafted propylene-based elastomer, graft comonomer units;
      wherein, the grafted propylene-based elastomer has a heat of fusion of less than 75 J/g and a $T_m$ of less than 105° C.; and
   c. a third component comprising a polar material,
   wherein the third component is at least partially adhered to the second component and the second component is at least partially adhered to the first component.

2. The composite structure of claim 1, wherein the propylene-based elastomer is a copolymer comprising from 0.1 to 30 wt %, based on the weight of the grafted propylene-based elastomer, primary comonomer units.

3. The composite structure of claim 1, wherein the first component comprises a rubber and a thermoplastic resin.

4. The composite structure of claim 3, wherein the rubber is selected from the group consisting of ethylene-propylene rubber (EPR), ethylene-propylene-diene rubber (EPDM), butyl rubber, homopolymers of a conjugated diene, copolymers of at least one conjugated diene with an aromatic monomer, copolymers of at least one conjugated diene with a polar monomer, unsaturated non-polar elastomers, natural rubber, polyisoprene, polybutadiene elastomer, styrene-butadiene elastomer and mixtures thereof; and
the thermoplastic resin is selected from the group consisting of crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

5. The composite structure of claim 4, wherein the thermoplastic resin is polypropylene.

6. The composite structure of claim 1, wherein the primary comonomer units derived from any of $C_2$ or $C_4$-$C_{20}$ alpha olefins.

7. The composite structure of claim 5, wherein the primary comonomer units are derived from ethylene and the grafted propylene-based elastomer has a heat of fusion of less than 50 J/g.

8. The composite structure of claim 1, wherein the graft comonomer units are derived from the group consisting of carboxylic acids, carboxylate anhydrides, carboxylate esters, carboxylate amides, carboxylate imides, metal carboxylate salts, epoxides, $C_1$-$C_8$ alkyl esters, $C_1$-$C_8$ glycidyl esters and mixtures thereof.

9. The composite structure of claim 1, wherein the graft comonomer units are derived from the group consisting of acrylic acid, methacrylic acid, maleic acid, fumaric acid, itaconic acid, acrylic anhydride, methacrylic anhydride, maleic anhydride, fumaric anhydride, itaconic anhydride, glycidyl methacrylate, glycidyl acrylate, allyl-glycidal ether, methallyl-glycidal ether, glycidyl-2-ethyl acrylate, glycidyl-2-propyl acrylate, isopropenylphenyl-glycidyl ethers and mixtures thereof.

10. The composite structure of claim 1, wherein the third component is a fiber, the fiber having a length of from 0.1 mm to 5.0 mm and a fineness of from 0.1 decitex to 5.0 decitex.

11. The composite structure of claim 10, wherein third component is selected from polyamides, polyesters, acrylics, rayon and mixtures thereof.

12. The composite structure of claim 11, wherein third component is selected from nylon, poly($C_1$-$C_6$ alkylene) terephthalates and mixtures thereof.

13. The composite structure of claim 1, wherein the graft comonomer units are present in the amount of from 0.1 wt % to 5.0 wt % based on the weight of the grafted propylene-based elastomer.

14. The composite structure of claim 1, wherein the graft comonomer units are present in the amount of from 0.3 wt % to 1.5 wt % based on the weight of the grafted propylene-based elastomer.

15. The composite structure of claim 1, wherein the graft comonomer units are present in the amount of from 0.5 wt % to 1.5 wt % based on the weight of the grafted propylene-based elastomer.

16. The composite structure of claim 1, wherein the grafted propylene-based elastomer has a melt index according to ASTM D1238 at 190° C. and 2.16 kg weight of from 0.1 dg/min to 50 dg/min.

17. The composite structure of claim 1, wherein the grafted propylene-based elastomer has a melt index according to ASTM D1238 at 190° C. and 2.16 kg weight of from 1.0 dg/min to 25 dg/min.

18. The composite structure of claim 1, wherein the rubber is at least partially vulcanized.

19. The composite structure of claim 1, wherein the original Renault adhesion rating is of from 2 to 4+.

20. The composite structure of claim 1, wherein the cataplasm heat aged Renault adhesion rating is of from 3 to 4+.

21. The composite structure of claim 1, wherein the original Renault adhesion rating is of from 1 to 4+ and the cataplasm heat aged Renault adhesion rating is of from 3 to 4+.

22. A shaped article comprising the composite structure of claim 1.

23. The shaped article of claim 21, wherein the shaped article is selected from automotive weather seals, glass run channels, a noise attenuating device, automotive interior part, automotive belt, automotive hose, industrial belt, industrial hose, packaging material, construction material, decorative building material, handbag, backpack, clothing article, hand or power tool, drawer or cabinet liner, picture frame or hunting decoy.

24. A composite structure comprising:
a. a first component comprising an elastomeric component comprising a rubber and a thermoplastic resin;
b. a second component comprising a grafted propylene-based elastomer comprising
   i. propylene-derived monomer units;
   ii. from 0.1 to 30 wt %, based on the weight of the grafted propylene-based elastomer, primary comonomer units derived from any of $C_2$ or $C_4$-$C_{20}$ alpha olefins;
   iii. from 0.1 to 10 wt %, based on the weight of the grafted propylene-based elastomer, graft comonomer units;
   wherein, the grafted propylene-based elastomer has a heat of fusion of less than 75 J/g and a $T_m$ of less than 105° C.; and
c. an adhesive component; and
d. a third component comprising polyamide, polyester, acrylic, rayon or mixtures thereof,
wherein the third component is at least partially adhered to the adhesive component, the adhesive component is at least partially adhered to the second component and the second component is at least partially adhered to the first component.

25. The composite structure of claim 24, wherein the rubber is selected from the group consisting of ethylene-propylene rubber (EPR), ethylene-propylene-diene rubber (EPDM), butyl rubber, homopolymers of a conjugated diene, copolymers of at least one conjugated diene with an aromatic monomer, copolymers of at least one conjugated diene with a polar monomer, unsaturated non-polar elastomers, natural rubber, polyisoprene, polybutadiene elastomer, styrene-butadiene elastomer and mixtures thereof;
the thermoplastic resin is selected from the group consisting of crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof; and the graft comonomer units are derived from the group consisting of carboxylic acids, carboxylate anhydrides, carboxylate esters, carboxylate amides, carboxylate imides, metal carboxylate salts, epoxides, $C_1$-$C_8$ alkyl esters, $C_1$-$C_8$ glycidyl esters and mixtures thereof.

26. The composite structure of claim 25, wherein the rubber is selected from the group consisting of ethylene-propylene rubber (EPR), ethylene-propylene-diene rubber (EPDM), butyl rubber and mixtures thereof;

the thermoplastic resin is selected from the group consisting of polypropylene, propylene copolymers and mixtures thereof; and the graft comonomer units are derived from the group consisting of acrylic acid, methacrylic acid, maleic acid, acrylic anhydride, methacrylic anhydride, maleic anhydride, glycidyl methacrylate, glycidyl acrylate, glycidyl acrylate and isopropenylphenyl-glycidyl ethers and mixtures thereof.

27. The composite structure of claim 26, wherein the graft comonomer units are present in the amount of from 0.1 wt % to 1.5 wt % based on the weight of the grafted propylene-based elastomer.

28. The composite structure of claim 25, wherein the adhesive component comprises a polyurethane, acrylic, epoxy or mixtures thereof.

29. The composite structure of claim 25, wherein the adhesive component is substantially solvent free.

30. The composite structure of claim 25, wherein the third component is selected from nylon, poly($C_1$-$C_6$ alkylene) terephthalates and mixtures thereof and is a fiber, the fiber having a length of from 0.1 mm to 5.0 mm and a fineness of from 0.1 decitex to 5.0 decitex.

31. The composite structure of claim 25, wherein the original Renault adhesion rating is of from 2 to 4+.

32. The composite structure of claim 25, wherein the cataplasm heat aged Renault adhesion rating is of from 3 to 4+.

33. The composite structure of claim 25, wherein the original Renault adhesion rating is of from 1 to 4+ and the cataplasm heat aged Renault adhesion rating is of from 3 to 4+.

34. The composite structure of claim 25, wherein the rubber is at least partially vulcanized.

35. A composite structure comprising a flock and a grafted propylene-based elastomer, the grafted propylene-based elastomer comprising:
   i. propylene-derived monomer units;
   ii. from 0.1 to 30 wt %, based on the weight of the grafted propylene-based elastomer, primary comonomer units derived from any of $C_2$ or $C_4$-$C_{20}$ alpha olefins;
   iii. from 0.1 to 10 wt %, based on the weight of the grafted propylene-based elastomer, graft comonomer units;
      wherein, the grafted propylene-based elastomer has a heat of fusion of less than 75 J/g and a $T_m$ of less than 105° C.; and
where the flock comprising polyamide, polyester, acrylic, rayon or mixtures thereof.

36. The composite structure of claim 35, wherein the flock is at least partially adhered to the grafted propylene-based elastomer.

37. The composition of claim 35, wherein the primary comonomer units are present in the amount of from 0.5 wt % to 15 wt % based on the weight of the grafted propylene-based elastomer.

38. The composite structure of claim 35, wherein in the graft comonomer units are derived from the group consisting of carboxylic acids, carboxylate anhydrides, carboxylate esters, carboxylate amides, carboxylate imides, metal carboxylate salts, epoxides, $C_1$-$C_8$ alkyl esters, $C_1$-$C_8$ glycidyl esters and mixtures thereof.

39. The composite structure of claim 35, wherein the graft comonomer units are derived from the group consisting of acrylic acid, methacrylic acid, maleic acid, fumaric acid, itaconic acid, acrylic anhydride, methacrylic anhydride, maleic anhydride, fumaric anhydride, itaconic anhydride, glycidyl methacrylate, glycidyl acrylate, allyl-glycidal ether, methallyl-glycidal ether, glycidyl-2-ethyl acrylate, glycidyl-2-propyl acrylate, isopropenylphenyl-glycidyl ethers and mixtures thereof.

40. The composition of claim 35, wherein the graft comonomer units are present in the amount of from 0.5 wt % to 2.0 wt % based on the weight of the grafted propylene-based elastomer.

41. The composite structure of claim 35, wherein the third component is a fiber, the fiber having a length of from 0.1 mm to 5.0 mm and a fineness of from 0.1 decitex to 5.0 decitex.

42. The composite structure of claim 35, wherein the flock is selected from nylon, poly($C_1$-$C_6$ alkylene) terephthalates and mixtures thereof.

43. The composite structure of claim 35, wherein the grafted propylene-based elastomer has a melt index according to ASTM D1238 at 190° C. and 2.16 kg weight of from 1.5 dg/min to 10 dg/min.

44. A useful article comprising the composite structure of claim 35, wherein the useful article is a noise attenuating device, automotive interior part, automotive belt, automotive hose, industrial belt, industrial hose, packaging material, construction material, decorative building material, handbag, backpack, clothing article, hand or power tool, drawer or cabinet liner, picture frame or hunting decoy.

45. An automotive weather seal comprising:
   a. a first elastomeric component;
   b. a second component comprising a grafted propylene-based elastomer comprising
      i. propylene-derived monomer units;
      ii. from 0.1 to 30 wt %, based on the weight of the grafted propylene-based elastomer, primary comonomer units derived from any of $C_2$ or $C_4$-$C_{20}$ alpha olefins;
      iii. from 0.1 to 10 wt %, based on the weight of the grafted propylene-based elastomer, graft comonomer units;
         wherein, the grafted propylene-based elastomer has a heat of fusion of less than 75 J/g and a $T_m$ of less than 105° C.; and
   c. an adhesive component; and
   d. a third component comprising polyamide, polyester, acrylic, rayon or mixtures thereof,
wherein the third component is at least partially adhered to the adhesive component, the adhesive component is at least partially adhered to the second component and the second component is at least partially adhered to the first component.

46. The automotive weather seal of claim 45, wherein the first elastomeric component comprises an at least partially vulcanized rubber and a thermoplastic resin.

47. The automotive weather seal of claim 46, wherein the rubber is selected from the group consisting of ethylene-propylene rubber (EPR), ethylene-propylene-diene rubber (EPDM), butyl rubber, homopolymers of a conjugated diene, copolymers of at least one conjugated diene with an aromatic monomer, copolymers of at least one conjugated diene with a polar monomer, unsaturated non-polar elastomers, natural rubber, polyisoprene, polybutadiene elastomer, styrene-butadiene elastomer and mixtures thereof the thermoplastic resin is selected from the group consisting of crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof and the graft comonomer units are derived from the group consisting of carboxylic acids, carboxylate anhydrides, carboxylate esters, carboxylate amides, carboxylate imides, metal carboxylate salts, epoxides, $C_1$-$C_8$ alkyl esters, $C_1$-$C_8$ glycidyl esters and mixtures thereof.

48. The automotive weather seal of claim 47, wherein the third component selected from nylon, poly($C_1$-$C_6$ alkylene) terephthalates and mixtures thereof and is a fiber, the fiber having a length of from 0.1 mm to 5.0 mm and a fineness of from 0.1 decitex to 5.0 decitex.

49. A composite structure comprising:
a. a first elastomeric component comprising an at least partially vulcanized rubber and a thermoplastic resin;
b. a second polar component selected from polyamide, polyester, acrylic, rayon and mixtures thereof;
c. optionally, a third adhesive component; and
d. means for adhering the second polar component to at least one of the first elastomeric component or the third adhesive component.

wherein (i) the adhering means comprises a grafted propylene-based elastomer, and (ii) the second polar component is selected from nylon, poly($C_1$-$C_6$ alkylene) terephthalates and mixtures thereof and is a fiber, the fiber having a length of from 0.1 mm to 5.0 mm and a fineness of from 0.1 decitex to 5.0 decitex.

* * * * *